United States Patent
Oh et al.

(10) Patent No.: US 7,629,973 B2
(45) Date of Patent: Dec. 8, 2009

(54) SYSTEM AND METHOD FOR GENERATING SURFACE MESH SURROUNDING PARTICLES

(75) Inventors: Seung Taik Oh, Gyeonggi-Do (KR); Bon Ki Koo, Daejeon (KR); Manjai Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 456 days.

(21) Appl. No.: 11/633,191

(22) Filed: Dec. 4, 2006

(65) Prior Publication Data
US 2007/0132758 A1    Jun. 14, 2007

(30) Foreign Application Priority Data
Dec. 8, 2005    (KR) ............... 10-2005-0119875
Oct. 13, 2006   (KR) ............... 10-2006-0099878

(51) Int. Cl.
   *G06T 15/30*    (2006.01)
(52) U.S. Cl. .................. 345/423; 345/419; 345/420; 345/421; 345/619; 430/24; 430/108; 703/2; 703/10
(58) Field of Classification Search .......... 345/419, 345/420, 423, 619, 421; 430/108.24
See application file for complete search history.

(56) References Cited

U.S. PATENT DOCUMENTS

| | | | | |
|---|---|---|---|---|
| 6,100,893 A * | 8/2000 | Ensz et al. | ................ | 345/420 |
| 6,718,291 B1 * | 4/2004 | Shapiro et al. | ................ | 703/2 |
| 6,810,370 B1 * | 10/2004 | Watts, III | ................ | 703/10 |

* cited by examiner

*Primary Examiner*—Kimbinh T Nguyen
(74) *Attorney, Agent, or Firm*—Ladas & Parry LLP

(57) ABSTRACT

Provided are a system for generating a surface mesh surrounding particles on a 3D space. An implicit function module receives particle data containing three-dimensional location and radius data of the particles, grids the particles into rectangular parallelepiped shape, and generates implicit function data having implicit function value determining the surface at grid points. A mesh module generates a mesh through a pre-process of substituting the implicit function value of the gird point, where the implicit function value is defined, by zero when the a distance between a grid point where the implicit function value of the implicit function data and the vertex of the mesh is within a set distance. Accordingly, the system and method are useful for visualizing the results of particle simulations used in basic science and engineering. In particular, the system and method can generate high-quality mesh in computer graphics of fluid simulation using the particles.

6 Claims, 2 Drawing Sheets

SYSTEM AND METHOD FOR GENERATING SURFACE MESH SURROUNDING PARTICLES

BACKGROUND OF THE INVENITON

1. Field of the Invention

The present invention relates to a system and method for generating a surface mesh surrounding particles, and more particularly, to a system and method for generating a surface mesh surrounding particles, which can visualize particle simulation results faster and more effectively in basic science and engineering.

2. Description of the Related Art

A method for rendering particles into three-dimensional (3D) spheres and visualizing the results has been proposed. This method has an advantage in that it is very simple and can roughly estimate the results rapidly. However, this method is unsuitable for computer graphics field requiring more accurate surface information. Specifically, when spherical surfaces overlap each other, a mesh of the inside of the spheres is unnecessarily generated. Thus, an amount of data unnecessarily increases.

In recent years, methods for finding a surface mesh corresponding to a fluid surface in a fluid simulation using particles have been studied. Desbrun adopted a method of calculating an equi-density surface using density values of fluid particles. However, finding a reference value for calculation of the equi-density surface is very ambiguous. In some cases, important portions of the fine fluid surface disappear. Thus, it often seems that viscosity of the fluid is large.

According to another method proposed by Mueller et. al, a color field is formed by assigning a value of 1 to a fluid particle and a value of 0 to the others, and a fluid surface is calculated using a method of calculating an equi-surface with respect to a specific value. Also, a surface tension in a specific location is calculated. Compared with the Desbrun's method, the Mueller's method has an advantage in that it usable in the general particles because a fluid density is not used, but it also has a disadvantage of ambiguity and blurring.

SUMMARY OF THE INVENTION

Accordingly, the present invention is directed to a system and method for generating a surface mesh surrounding particles, which substantially obviates one or more problems due to limitations and disadvantages of the related art.

It is an object of the present invention to provide a system and method for generating a surface mesh surrounding particles. Since the particle surface expression is derived using the Ricci's union modeling method considering the radius of the particle, the blurring of the mesh generated as the density function or color field can be prevented and thus the fine expression is possible. Also, in calculating the particle surface expression obtained by the Ricci's union modeling, the grid point is initialized to zero and only the neighbor grid points located below a predetermined distance of the grid point are updated as the implicit function value. Therefore, the generation time of the implicit function can be remarkably reduced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. To achieve these objects and other advantages and in accordance with the purpose of the invention, as embodied and broadly described herein, there is provided a system for generating a surface mesh surrounding particles, including: an implicit function module for receiving particle data containing three-dimensional location and radius data of the particles, gridding the particles into rectangular parallelepiped shape, and generating implicit function data having implicit function value determining the surface at grid points; and a mesh module for generating a mesh through a pre-process of substituting the implicit function value of the gird point, where the implicit function value is defined, by zero when the a distance between a grid point where the implicit function value of the implicit function data and the vertex of the mesh is within a set distance.

In accordance with another aspect of the present invention, there is provided a method for generating a surface mesh surrounding particles, including the steps of: (a) at an implicit function module, receiving particle data containing three-dimensional location and radius data of the particles, gridding the particles into rectangular parallelepiped shape, and generating implicit function data having implicit function value determining the surface at grid points; and (b) at a mesh module, generating a surface mesh through a polygon mesh generating process using a tetrahedron-based region division for processing implicit function data containing zero.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
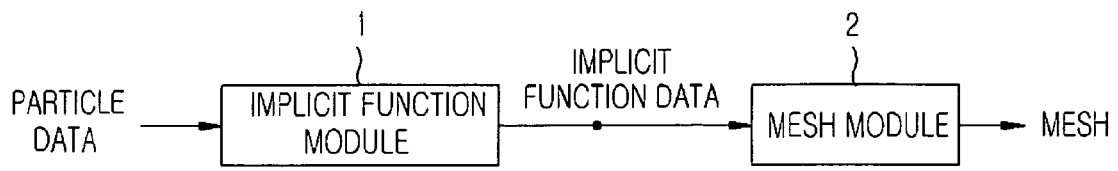
FIG. 1 is a block diagram of a system for generating a surface mesh according to an embodiment of the present invention.
Figure 2:
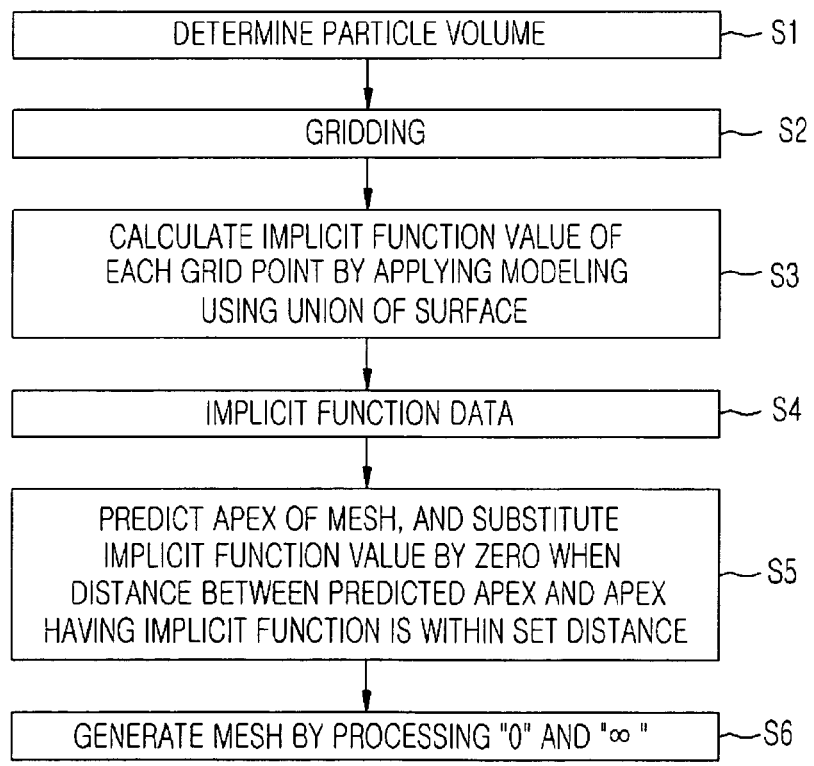
FIG. 2 is a flowchart illustrating a method for generating a surface mesh according to an embodiment of the present invention.

FIG. 1 is a block diagram of a system for generating a surface mesh according to an embodiment of the present invention, and FIG. 2 is a flowchart illustrating a method for generating a surface mesh according to an embodiment of the present invention Referring to FIGS. 1 and 2, the system for generating the surface mesh according to an embodiment of the present invention includes an implicit function module 1 for generating implicit function data of surfaces surrounding particles, and a mesh module 2 for generating a mesh from the implicit function data. The system receives particle data as input data and generates mesh data through the implicit function module 1 and the mesh module 2.

The implicit function module 1 will be described below in more detail.

The implicit function module 1 receives the particle data as the input data and generates the implicit function data of the surface as the result value. The particle data contains a 3D location and a radius of each particle. The implicit function data has specific function values at grid points when a rectangular parallelepiped surrounding the particle is gridded.

More specifically, the implicit function module 1 determines a particle volume having a rectangular parallelepiped shape (S1), grids the particle volume considering the particle radius (S2), calculates the implicit function values determining the surface at each grid point (S3), and obtain the implicit function data (S4).

At this point, the process of generating the implicit function data at the grid points is a core of the implicit function module 1. In order to generate the implicit function, this invention uses a modeling method using union of a surface (Ricci, A constructive geometry for computer graphics, The Computer Journal, 16(2)).

Figure 3:
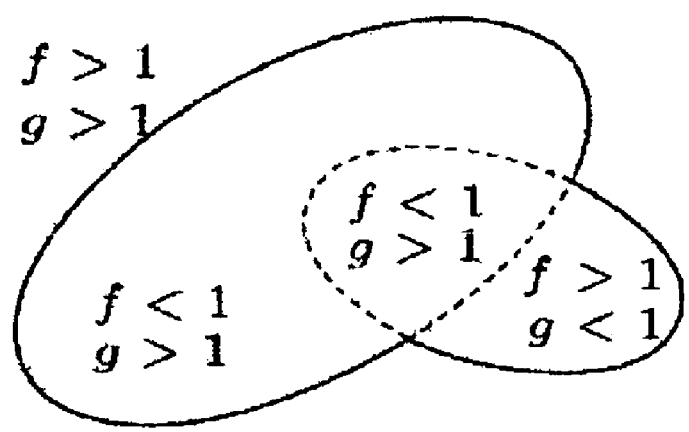
FIG. 3 illustrates a Ricci's union modeling with respect to two elliptical regions according to an embodiment of the present invention.

That is, assuming that $f_i(x, y, z)$ is a non-negative function (i.e, $M_i=\{(x, y, z)|f_i(x, y, z)=1\}$) representing surfaces $M_i$ and $f(x, y, z):=\min(f_1(x, y, z), \ldots, f_n(x, y, z))$, $M_i=\{(x, y, z)|f_i(x, y, z)=1\}$ represents a boundary of a region defined by union of the inside of the surfaces $M_i$. This is illustrated in detail in FIG. 3. Specifically, Ricci showed that when $U_p := (f_1^{-p} + \ldots + f_n^{-p})^{-1/p}$, $$\min(f_1(x, y, z, \ldots, f_n(x, y, z)) = \lim_{p \to \infty} U_p$$

is obtained. Since a minimum value of a left term in $$\min(f_1(x, y, z, \ldots, f_n(x, y, z)) = \lim_{p \to \infty} U_p$$

is practically impossible, a right term is used. If using the Ricci's union modeling method, the particles are regarded as small spheres having a predetermined radius and the implicit function of the desired surface is given as their union. For the particle $(x_i, y_i, z_i, r_i)$, $f_i(x,y,z)=((x-x_i)^2+(y-y_i)^2+(z-z_i)^2)/r_i^2$. However, in the actual calculating process of $$\lim_{p \to \infty} U_p,$$

the infinity of p cannot be taken. Thus, for $p \leq 8$, $U_p$ is considered as the implicit function of the surface. Generally, as the value of p increases, it is possible to obtain the result that is much closer to the actual union. On the other hand, for $p>8$, the almost same results are obtained.

If this method is implemented using a general method, a large amount of calculation time is required because $f_i$ for each particle is defined with respect to an entire particle volume. According to the present invention, when $f_i$ is more than a specific distance, it is made to be infinity. Therefore, calculation time is remarkably reduced. Specifically, function values of all grid points are initialized to zero in an initial period. During the calculating process in each particle, only the grid points located within a set distance are updated. In this way, the grid points located away from the surface have infinity as the implicit function value. The mesh module 2 must process the infinity without error. Pseudocode for the implicit function is as follows:

```
For each grid point p_i
    Set f (p_i) ← 0
End for
For each particle of index i
    Determine the scaled distance function f_i
    Find neighbor grid points n_j
    For each neighbor grid point n_j
        Compute f_i(n_j)
        Update f (n_j) ← f (n_j) + f_i(n_j)^-p
    End for
End for
For each grid point p_i
    Set f (p_i) ← 1/f (p_i)^{1/p}
End for
```

The mesh module 2 will be described below in detail.

The mesh module 2 receives the implicit function data generated from the implicit function module 1 and generates the surface mesh as the result value. A polygon mesh generation algorithm using a tetrahedron-based region division is applied to the mesh module 2. Compared with the hexahedron-based polygon mesh generation algorithm (a so-called Marching cubes), the tetrahedron-based method is advantageous to processing the implicit function data containing zero.

In order to reduce the number of polygons of the generated mesh, a special pre-process is carried out (S5). This pre-process modifies the implicit function data. Specifically, vertices of the mesh are predicted and, if the grid points whose locations are defined as the implicit function, the implicit function values of the grid points are substituted by zero. The number of the polygons can be reduced to 50% through this process. The substitute condition is as follows. It is assumed that the grid point is v, its neighbor grid point is w, and their implicit function values are f and g, respectively. For convenience, $f>0$ and $g<0$. If the location of the expected vertex is less than $\epsilon$ ($0<\epsilon<0.5$), $f=0$. In other words, the substitute condition is as follows:

$$\frac{f}{f+|g|} < \varepsilon$$

When the substitute condition test is carried out with respect to all grid points, the pre-process is completed. Pseudocode for this process is as follows:

```
Determine a tolerance value ε
For each grid point p_i
    Set f ← f (p_i)
    For each neighbor grid point n_j
    If f and g have different signs
        Set r ← |f| / (|f| + |g|)
```

-continued

If $r < \varepsilon$

Set $f(p_i) \leftarrow 0$

End for

End for

The implicit function data that has undergone the pre-process contains zero and infinity. Thus, the special process is required. In the mesh module 2, the polygon mesh generation algorithm using the tetrahedron-based region division requires two modifications. First, when the polygons are extracted from the basic tetrahedron, the number of cases expanded considering zero is predicted. This method is disclosed in a paper of Koide et al., Polyhedral approximation approach to molecular orbital graphics, Journal of Molecular Graphics 4(3), 149-155. The process of the infinity may cause an error by the calculation of infinity/infinity during the process of calculating the vertex generation location of the mesh. However, this problem can be solved by placing the implicit function value of the grid point having no infinity at the numerator.

As described above, the system and method for generating the surface mesh surrounding the particle according to the present invention have the following effects.

First, since the particle surface expression is derived using the Ricci's union modeling method considering the radius of the particle, the blurring of the mesh generated as the density function or color field can be prevented and thus the fine expression is possible.

Second, in calculating the particle surface expression obtained by the Ricci's union modeling, the grid point is initialized to zero and only the neighbor grid points located below a predetermined distance of the grid point are updated as the implicit function value. Therefore, the generation time of the implicit function can be remarkably reduced.

Third, the number of the polygon of the mesh generated through the pre-process of the mesh module can be reduced by 50%.

Fourth, while the hexahedron-based polygon mesh generation algorithm (Marching cubes) has difficulty in processing data containing zero, the present invention can process the implicit function data having specific values of zero and infinity through the modification of the tetrahedron-based polygon generation algorithm.

Fifth, the algorithm and system according to the present invention can visualize various data expressed as particles fast and effectively It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A system for generating a surface mesh surrounding particles, comprising:

an implicit function module for receiving particle data comprising three-dimensional location and radius data of the particles, making a grid on a parallelepiped bounding volume of the particle data, and generating implicit function data at grid points; and a mesh module for generating a mesh though a pre-process of substituting the implicit function value of the grid point by zero when a distance between the grid point and the predicted vertex of the mesh is within a set distance.

2. A method for generating a surface mesh surrounding particles, comprising the steps of:

predicting a vertex of a mesh at a mesh module generated from implicit function data wherein the implicit function data is generated from particle data; and when a distance between the vertex of the mesh and a grid point where the implicit function value is defined is within a set distance, generating a surface mesh model at a mesh module through a pre-process of substituting the implicit function value of the grid point by zero as a following equation:

$$\frac{f}{f+|g|} < \varepsilon,$$

where f and g denote the implicit function values and $\epsilon$ denotes the location of the vertex.

3. A method for generating a surface mesh surrounding particles, comprising the steps of:

(a) at an implicit function module, receiving particle data comprising three-dimensional location and radius data of the particles, making a grid on a parallelepiped bounding volume of the particle data, and generating implicit function data at grid points; and (b) at a mesh module, generating a surface mesh through a polygon mesh generating process using a tetrahedron-based region division for processing implicit function data containing zero.

4. The method of claim 3, wherein the step (a) comprises the steps of:

(a1) determining a particle volume having a rectangular parallelepiped shape;

(a2) making a grid on the bounding volume according to radius thereof; and (a3) generating the implicit function data by calculating the implicit function value determining the surface at each grid point.

5. The method of claim 4, wherein the step (a3) uses a modeling method using union of the surface.

6. The method of claim 3, wherein the step (b) comprises the steps of:

(b1) predicting a vertex of the generated mesh, and substituting the implicit function value of the grid point by zero when a distance between a location of the predicted vertex and the grid point where the implicit function is defined is within a set distance as a following equation:

$$\frac{f}{f+|g|} < \varepsilon,$$

where f and g are denote the implicit function values and $\epsilon$ denotes the location of the vertex; and (b2) during the polygon mesh generating process using the tetrahedron-based region division, considering extended cases of a basic tetrahedron with zero arid values and extracting a mesh element or polygon from a basic tetrahedron.

* * * * *